J. O. OSTMAN.
SEWING MACHINE ATTACHMENT.
APPLICATION FILED APR. 5, 1910.
975,989.
Patented Nov. 15, 1910.
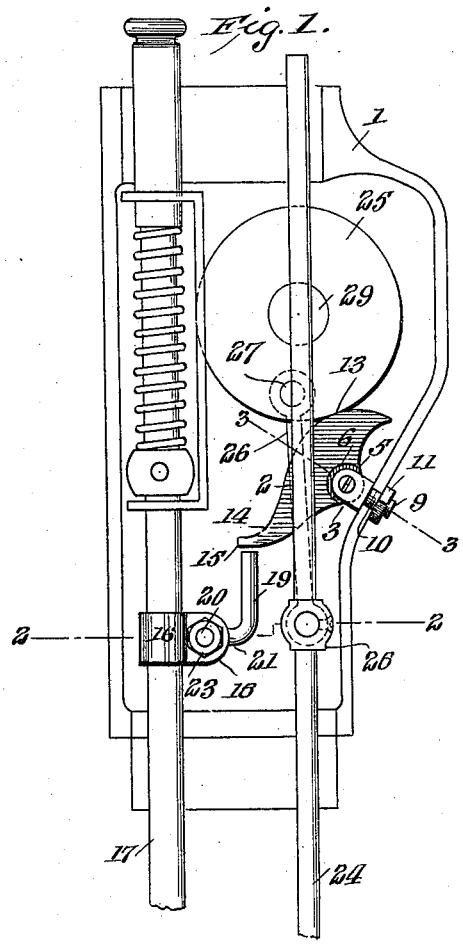
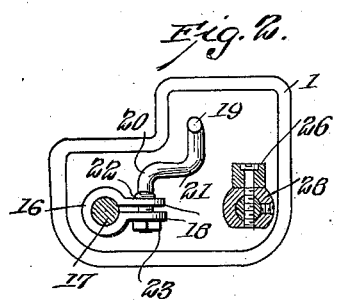
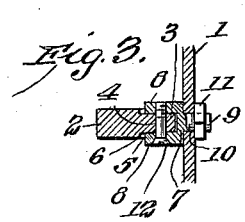
WITNESSES:
INVENTOR
JOSEPH O. OSTMAN
BY
ATTORNEYS

UNITED STATES PATENT OFFICE.

JOSEPH O. OSTMAN, OF HANCOCK, MICHIGAN, ASSIGNOR OF ONE-FOURTH TO AXEL IMMO AND ONE-FOURTH TO ARTHUR ABRAMSON, OF HANCOCK, MICHIGAN.

SEWING-MACHINE ATTACHMENT.

975,989.   Specification of Letters Patent.   Patented Nov. 15, 1910.

Application filed April 5, 1910. Serial No. 553,483.

*To all whom it may concern:*

Be it known that I, JOSEPH O. OSTMAN, a citizen of the United States, and a resident of Hancock, in the county of Houghton and State of Michigan, have made certain new and useful Improvements in Sewing-Machine Attachments, of which the following is a specification.

My invention is an improvement in sewing machine attachments, and consists in certain novel constructions and combinations of parts, hereinafter described and claimed.

The object of the invention is to provide an attachment for preventing reverse motion in machines of the character specified, which may be applied to existing machines without material changes, and which when the machine is not in the actual operation of sewing will not effect the operation thereof in any manner.

Referring to the drawings forming a part hereof, Figure 1 is a side view of the improvement, and Figs. 2 and 3 are sections on the lines 2—2 and 3—3 respectively of Fig. 1.

The present embodiment of the invention is shown attached to the head 1 of a sewing machine of any approved type, and consists of a cam lever 2, provided at one side with a lug 3 having a transverse perforation 4 and the lever is cut away at 5 at the sides of the lug to form an arc-shaped shoulder 6 on each side, whose center is the perforation. A yoke 7 is provided with spaced arms 8 extending in one direction, and with a threaded stem 9 extending in the opposite direction, and passing through an opening 10 in the casing of the head, and engaged by a nut 11, to hold the yoke in place. The arms 8 of the yoke receive the lug 3 between them, and a screw 12 is passed through openings in the arms which register with the opening 4 of the lug. The opening in one arm is threaded to prevent disengagement of the screw, and the lever is free to rock on the screw as a pivot. The upper end of the lever is formed into an eccentric cam face 13, which is adapted, when the lever is swinging free, to engage the driving shaft of the machine, and at its lower end the lever is provided with a concave surface 14 on the opposite side from the lug, and with a toe 15 extending laterally in the opposite direction from the lug 3. A split bearing ring 16 is secured on the presser foot bar 17 of the machine, the ends 18 of the ring being bent laterally and transversely perforated, and a rod 19 is provided with an angular threaded portion 20, offset laterally as at 21 from the rod, and passing through the openings of the said ends. The angular portion 20 is provided with a fixed collar 22 for engaging the outer face of one of the ends 18 of the ring, and a nut 23 is threaded onto the rod and engages the outer face of the other end. By loosening the nut 23, the bearing ring may be adjusted on the bar and is held in adjusted position, when the nut is tightened. The upper end of the rod 19 is in position to engage the toe 15 of the lever, and swing the said lever on its pivot, when the presser foot bar is lifted, and when the said bar is lowered, the rod is moved out of engagement with the toe of the lever. The needle bar 24 is connected to the disk 25 on the end of the driving shaft, 29, by means of a link 26, pivoted at one end to a wrist pin 27 on the disk, and at the other end to a collar 28 on the needle bar. The arc upon which the cam face or shoe 13 is formed is eccentric to the pivot of the lever so that when the drive shaft is rotating in a forward direction, the movement of the shaft tends to swing the upper end of the lever to the right of Fig. 1. When, however, the shaft rotates in a reverse direction, the movement thereof tends to swing the upper end of the lever in an opposite direction, and the high portion of the cam face acts as a brake to block the movement of the shaft. The cam face 13 of the lever acts as a brake shoe, and engages the periphery of the disk 25, when the lever swings into the position shown in Fig. 1, and when the presser foot bar is lifted, the cam face 13 is moved out of engagement with the disk, by the swinging of the lever.

In operation, when the presser foot is lifted, the material may be adjusted, and the needle bar may be moved freely for any necessary purpose, as for threading the needle and the like. When the foot is lowered into the material however, the rod 20 moves downward with the bar disengaging the toe, and permitting the lever to swing to bring the braking surface or face 13 into contact with the periphery of the disk. When so engaged, the disk is free to rotate in a forward direction, but any attempt to rotate in a reverse direction will be prevented, by the engagement of the cam face or brake shoe 13 with the periphery of the disk. The more force applied in the reverse direction, the tighter will the cam face be forced against the disk. The stoppage or braking action while quick is not so abrupt as to cause damage. The attachment may be applied to existing machines with but little change, requiring only the drilling of the opening 10.

The bearing ring may be adjusted to the exact point to give the best results, and it will be evident that when the machine is not in the actual operation of sewing, the attachment is out of action, and does not affect the operation of the machine in any manner.

While the cam face is shown as engaging the periphery of the disk, it might without change in principle be applied directly to the shaft, the disk being practically the shaft, and the cam lever is engaged with the disk merely to secure a quicker braking action.

I claim—

1. The combination with a sewing machine, of a bearing ring adjustably mounted on the presser foot bar, a rod extending upwardly from the ring, a yoke connected with the head of the machine, a lever provided intermediate its ends with a lug pivoted between the arms of the yoke, and having at its upper end a cam face forming a brake shoe for engagement with the driving shaft of the machine to prevent reverse movement thereof, said lever having a toe at its lower end for engagement by the rod when the presser foot bar is moved upwardly, to swing the lever to disengage the brake shoe from the shaft.

2. The combination with a sewing machine, of a lever pivoted intermediate its ends to the head of the machine and provided at its upper end with a cam face forming a brake shoe, the lever having an angular toe at its lower end, a rod adjustably mounted on the presser foot bar for engaging the toe to swing the lever when the bar is raised to hold the shoe out of contact with the shaft.

3. The combination with a sewing machine, of a lever pivoted intermediate its ends to the head, and having an eccentric cam face at its upper end normally engaging the drive shaft to prevent reverse movement thereof, said lever having an angular toe, a bearing ring adjustably mounted on the presser foot bar, and a rod connected with the ring, and engaging the toe to swing the cam face out of engagement with the shaft when the said bar is lifted.

4. The combination with a sewing machine, of a lever pivoted intermediate its ends to the head, and having an eccentric cam face at its upper end normally engaging the drive shaft to prevent reverse movement thereof, said lever having an angular toe, a bearing ring adjustably mounted on the presser foot bar, and means supported by the ring for engaging the toe to swing the cam face out of engagement with the shaft when the said bar is lifted.

5. The combination with a sewing machine, of a lever pivoted intermediate its ends to the head, and having an eccentric cam face at its upper end normally engaging the drive shaft to prevent reverse movement thereof, said lever having an angular toe, and means adjustably supported on the presser foot bar for engaging the toe to swing the cam face out of engagement with the shaft when the said bar is lifted.

6. The combination with a sewing machine, of a lever pivoted intermediate its ends to the head, and having an eccentric cam face at its upper end normally engaging the drive shaft to prevent reverse movement thereof, and means adjustable on the presser foot bar for engaging the lever to swing the cam face out of engagement with the shaft when the said bar is lifted.

7. An attachment for sewing machines, comprising a lever, means for pivotally supporting the lever intermediate its ends, means for detachably connecting said means with the machine, said lever having a cam face eccentric to the pivot at its upper end for engaging the driving shaft of the machine to prevent reverse movement, a bearing ring, means for detachably and adjustably connecting the ring with the presser foot bar, and means on the ring for engaging the bar to swing the cam face out of engagement with the shaft when the said bar is lifted.

8. The combination with a sewing machine, of a lever having an eccentric cam face at one end normally engaging the drive shaft to prevent reverse rotation thereof, and means adjustably supported on the presser foot bar for moving the lever to swing the cam face out of engagement with the shaft when the said presser foot bar is lifted.

9. The combination with a sewing machine, of means engaging the drive shaft to prevent reverse rotation thereof, means on the presser foot bar for moving the said means out of engaging position when the presser foot bar is lifted, and means for adjustably supporting the said means on the presser foot bar.

10. The combination with a sewing machine, of means engaging the drive shaft to prevent reverse rotation thereof, and means on the presser foot bar for moving the said means out of engaging position when the presser foot bar is lifted.

JOSEPH O. OSTMAN.

Witnesses:
 JOHN KÜSKILA,
 SAMUEL JUNTTILA.